United States Patent
Brandao Silva et al.

(10) Patent No.: US 12,274,354 B2
(45) Date of Patent: Apr. 15, 2025

(54) ORAL TREATMENT DEVICE

(71) Applicant: KONINKLIJKE PHILIPS N.V., Eindhoven (NL)

(72) Inventors: Priscilla Brandao Silva, Eindhoven (NL); Lutz Christian Gerhardt, Eindhoven (NL); Mark Thomas Johnson, Arendonk (BE); Gerardus Johannes Nicolaas Doodeman, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 221 days.

(21) Appl. No.: 17/927,689

(22) PCT Filed: May 20, 2021

(86) PCT No.: PCT/EP2021/063400
§ 371 (c)(1),
(2) Date: Nov. 23, 2022

(87) PCT Pub. No.: WO2021/239550
PCT Pub. Date: Dec. 2, 2021

(65) Prior Publication Data
US 2023/0172351 A1   Jun. 8, 2023

(30) Foreign Application Priority Data
May 28, 2020   (EP) .................................. 20176968

(51) Int. Cl.
*A46B 15/00*   (2006.01)
*A61C 17/22*   (2006.01)
(52) U.S. Cl.
CPC ........ *A46B 15/0022* (2013.01); *A61C 17/221* (2013.01)

(58) Field of Classification Search
CPC .. A46B 15/0022; G02B 1/002; A61C 17/221; A61B 5/05; A61B 5/053; H01Q 15/02;
(Continued)

(56) References Cited

U.S. PATENT DOCUMENTS 10,201,701 B2 *   2/2019   Levi ........................ A61C 17/32
2016/0361002 A1 *  12/2016   Palikaras ............. A61B 5/1455
(Continued)

FOREIGN PATENT DOCUMENTS

EP          3148003 A1      3/2017
WO       2021239548 A1     12/2021

OTHER PUBLICATIONS

International Search Report and Written Opinion Dated Oct. 1, 2021 for International Application No. PCT/EP2021/063400 Filed May 20, 2021.
(Continued)

*Primary Examiner* — Katina N. Henson

(57) ABSTRACT

The invention provides for an oral treatment unit, or an assembly of a plurality of oral treatment units, for confining an electromagnetic field having a frequency in the range of 100 kHz to 300 MHz and adapted to be inserted into an oral cavity, which may form part of an oral cleaning device in combination with a base unit, including a first cleaning element coupled to the oral treatment unit. The oral treatment unit further includes a material structure coupled to the oral treatment unit adapted to receive an initial electromagnetic field and output a focused electromagnetic field, wherein the material structure has a passive electromagnetic field focusing function, which focuses the received initial electromagnetic field in the near-field region of the material structure. A further aspect of the invention provides for an oral treatment unit, or an assembly of a plurality of oral treatment units, for confining and modulating an electro-
(Continued)

magnetic field having a frequency in the range of 1 MHz to 300 GHz and adapted to be inserted into the mouth, which may form part of an oral cleaning device in combination with a base unit, including a first cleaning element coupled to the oral treatment unit. The oral treatment unit further comprises an electromagnetic field focusing element adapted to receive an electromagnetic field having an initial frequency and output a focused electromagnetic field. The electromagnetic field focusing element comprises a first material structure having a first passive electromagnetic field focusing function, which confines the modulated electromagnetic field at a given distance from the first material structure by performing one or more of: an attenuation rate control function in the near-field region of the first material structure; or a propagation direction modification function on the electromagnetic field. The electromagnetic field focusing element has a modulation function that modulates the confined electromagnetic field, thereby generating a modulated electromagnetic field.

20 Claims, 14 Drawing Sheets

(58) Field of Classification Search
CPC ............ H01Q 15/0086; G02F 2203/15; G02F 2203/30
USPC ....................................................... 15/167.1
See application file for complete search history.

(56) References Cited

U.S. PATENT DOCUMENTS

2017/0093045 A1* 3/2017 Savage .............. H01Q 15/0086
2018/0076531 A1 3/2018 Polehn et al.

OTHER PUBLICATIONS

Wikipedia—The Free Encyclopedia "Beat (acoustics)" https://en.wikipedia.org/wiki/Beat_(acoustics).
Electronics Notes—Incorporating Radio-Elecronics.com "RF Mixing / Multiplication: Frequency Mixers" https://www.electronics-notes.com/articles/radio/rf-mixer/rf-mixing-basics.php.
Circuit Cellar—Inspiring the Evolution of Embedded Design Written by Circuit Cellar Staff "Fundamentals of I/Q Signals" Feb. 10, 2015 https://circuitcellar.com/cc-blog/fundamentals-of-iq-signals/.
Wikipedia—The Free Encyclopedia "Heterodyne" https://en.wikipedia.org/wiki/Heterodyne.
Wikipedia—The Free Encyclopedia "Frequency mixer" https://en.wikipedia.org/wiki/Frequency_mixer.
All About Circuits "Understanding Quadrature Demodulation" vol. Practical Guide to Radio-Frequency Analysis and Design; Chapter 5 Radio Frequency Demodulation https://www.allaboutcircuits.com/textbook/radio-frequency-analysis-design/radio-frequency-demodulation/understanding-quadrature-demodulation.

* cited by examiner

ORAL TREATMENT DEVICE

This application is the U.S. National Phase application under 35 U.S.C. § 371 of International Application No. PCT/EP2021/063400, filed on May 20, 2021, which claims the benefit of EP Application Serial No. 20176968.4, filed May 28, 2020. These applications are hereby incorporated by reference herein.

FIELD OF THE INVENTION

The invention relates to the field of oral cleaning devices, and more specifically to the field of oral cleaning devices utilizing an electromagnetic field.

BACKGROUND OF THE INVENTION

The field of oral cleaning and hygiene is under constant development, particularly in the field of powered toothbrushes and other oral cleaning devices, such as brushing mouthpieces, combined brushing and flossing devices or irrigators.

One such development is the inclusion of a means of generating a radio frequency (RF) electromagnetic field, referred to herein as a RF field, proximate to the teeth and gums of a user.

FIG. 1 shows a simulation result of a simplified example of an existing oral treatment unit 10 comprising: a non-conductive, dielectric barrier 12; a first RF electrode 13; and a second RF electrode 14.

In use, an electric signal in the radio frequency range is provided to the first and second RF electrodes, thereby generating an RF field 15 between the two electrodes. As the RF field lines cannot pass through the non-conductive barrier 12, the RF field is shaped around the dielectric barrier and re-directed/deflected towards the teeth and gums of the user.

In other words, the example of FIG. 1 delivers an RF field using three elements: two exposed metallic conductors and one insulator, as well as the non-conducting barrier needed to shape and re-direct the electromagnetic field to go near the teeth.

However, the example shown in FIG. 1 requires numerous separate, powered components increasing the complexity of manufacture and requires exposed metal electrical contacts to be positioned within the user's mouth, the latter giving rise to a higher risk of injury or in-mouth discomfort due to mechanically sharp and electrically active exposed elements in the oral cavity. Furthermore, the existing solution provides only rough control of the RF field confinement and is prone to electromagnetic energy leakage in the form of radiation.

There is therefore a need for a means of generating an improved confinement and focusing of an RF field using a reduced number of components and without the need for exposed metal contacts to be positioned within an oral cavity.

Further, the means of generating a radio frequency (RF) electromagnetic field, referred to herein as a RF field, proximate to the teeth and gums of a user is subject to size limitations in order to comfortably fit in the oral cavity.

Accordingly, there is therefore a further need for a means of generating a confined RF field using components with a reduced form factor to be positioned within an oral cavity.

U.S. Pat. No. 10,201,701 discloses an oral cleaning device having an RF generator in a handle portion that delivers RF energy to electrodes on the brush head next to the bristles.

SUMMARY OF THE INVENTION

The invention is defined by the claims.

According to examples in accordance with an aspect of the invention, there is provided an oral treatment unit for confining an electromagnetic field having a frequency in the range of 100 kHz to 300 MHz and adapted to be inserted into the oral cavity of a user, the oral treatment unit comprising:

a first cleaning element coupled to or integrated in the oral treatment unit; and a material structure coupled to or integrated in the oral treatment unit adapted to receive an initial electromagnetic field and output a focused electromagnetic field, wherein the material structure has a passive electromagnetic field focusing function, which confines the received initial electromagnetic field in the near-field region of the material structure.

The oral treatment unit provides for a means of focusing an electromagnetic field, for example having a frequency within a radio frequency (RF) range, within the near-field region of the material structure to aid in the cleaning of the user's mouth by producing a confined electromagnetic (EM) field in the region of a user's teeth or gums.

In this way, a focused EM field may be generated without the need for a dielectric barrier or any exposed electrical conductors within the oral treatment unit contacting the user's mouth.

Further, as the focusing function is a property of the material structure, the shape and focus of the EM field may be adjusted according to any given implementation of the oral treatment unit.

In an embodiment, the material structure comprises a plurality of unit cells, and optionally wherein the plurality of unit cells are arranged in an array.

In this way, if the dimension of the unit cell is much smaller than the wavelength of the applied EM field, the material structure may act as a single element whose overall electromagnetic properties modify the EM field, and the resultant confinement, distribution and shaping of the EM field, results from the homogenization of individual properties within the unit cells.

In an embodiment, the oral treatment unit further comprises a second cleaning element, and wherein the material structure forms at least part of, or all of, the second cleaning element.

In this way, the material structure may contribute to both mechanical cleaning actions and EM field confinement or shaping, thereby performing a dual function.

In an embodiment, the unit cell comprises:
a planar conductive spiral structure; or
a planar conductive ring structure; or
a planar conductive meander line structure; or
a 3D conductive spiral structure; or
a 3D conductive ring structure; or
a 3D conductive meander line structure.

In this way, the EM field received by the material structure may be transformed into an evanescent wave.

In an embodiment, the material structure comprises:
a first unit cell adapted to receive and focus a first electromagnetic field having a first frequency within a first frequency range; and
a second unit cell adapted to receive and focus a second electromagnetic field having a second frequency within a second frequency range different from the first frequency range.

In this way, multiple EM fields having different frequencies can be provided, without the need to activate different device operation modes.

In an embodiment, the material structure has one or more of:
a negative or near-zero effective permittivity;
a negative or near-zero effective permeability; and
a negative or near-zero refractive index.

In an embodiment, the oral treatment unit further comprises one or more transmitter coils adapted to generate the initial electromagnetic field to be received by the material structure.

In an embodiment, the oral treatment unit further comprises a multi-harmonic transmitter coil adapted to generate a first electromagnetic field in a first frequency range to be received by the first unit cell and a second electromagnetic field in a second frequency range to be received by the second unit cell.

In an embodiment, the oral treatment unit further comprises a first transmitter coil adapted to generate an electromagnetic field having a first frequency within a first frequency range and a second transmitter coil adapted to generate an electromagnetic field having a first frequency within a second frequency range.

In an embodiment, a coil loop of the transmitter coil and the spiral structure of the unit cell are parallel and/or coaxially aligned.

In this way, the coupling between the transmitter coil and the unit cell or material structure is improved.

According to examples in accordance with an aspect of the invention, there is provided a base unit for use in combination with the oral treatment unit described above, comprising:
a power source;
an electrical signal generation unit coupled to the power source and adapted to generate an electrical signal having a frequency in a given frequency range; and
one or more transmitter coils in communication with the electrical signal generator adapted to generate and transmit at least one electromagnetic field having a frequency within the given frequency range to the oral treatment unit.

According to examples in accordance with an aspect of the invention, there is provided a base unit for use in combination with the oral treatment unit described above, comprising:
a power source;
an electrical signal generation unit coupled to the power source and adapted to generate an electrical drive signal having a frequency in a given frequency range feeding the transmitter coil of the oral treatment unit.

According to examples in accordance with an aspect of the invention, there is provided an oral cleaning device comprising:
one or more of the oral treatment units as described above; and
the base unit described above, wherein the oral treatment unit is adapted to be temporarily coupled to the base unit.

According to examples in accordance with an aspect of the invention, there is provided an oral cleaning device comprising:
one or more of the oral treatment units as described above;
the base unit as described above; and
wherein the oral treatment unit is adapted to be temporarily coupled to the base unit, and wherein the oral treatment unit further comprises a first electrical contact and the base unit further comprises a second electrical contact, wherein the first electrical contact and the second electrical contact are in contact when the oral treatment unit is coupled to the base unit.

In an embodiment, the oral treatment unit is an electric toothbrush head, or part of an electric toothbrush head, wherein the electric toothbrush head optionally comprises a fluid emitting nozzle, and wherein the base unit is an electric toothbrush handle or one or more of the oral treatment units described above are arranged to form at least part of a brushing arch of an oral treatment mouthpiece, and wherein the base unit is an electric mouthpiece handle.

According to examples in accordance with a further aspect of the invention, there is provided oral treatment unit for confining and modulating an electromagnetic field having a frequency in the range of 1 MHz to 300 GHz and adapted to be inserted into the oral cavity of a user, the oral treatment unit comprising:
a first cleaning element coupled to or integrated in the oral treatment unit; and
an electromagnetic field focusing element coupled to or integrated in the oral treatment unit and adapted to receive an electromagnetic field having an initial frequency and output a focused electromagnetic field, wherein the electromagnetic field focusing element comprises a first material structure, wherein the first material structure has a first passive electromagnetic field focusing function, which confines the received electromagnetic field at a given distance from the first material structure by performing one or more of:
an attenuation rate control function in the near-field region of the first material structure; or
a propagation direction modification function on the electromagnetic field; and
wherein the electromagnetic field focusing element has a modulation function that modulates the confined electromagnetic field, thereby generating a modulated electromagnetic field.

The oral treatment unit comprising the electromagnetic field focusing element provides for a means of modulating an incoming electromagnetic field into a desired frequency range, such as a radio frequency range.

Electromagnetic fields with a frequency in the radio frequency range are desirable for oral treatment applications; however, material structures having a passive electromagnetic field focusing function tuned for radio frequencies may not be suitable for application in oral treatment applications, for example, due to material structure form factor or manufacturing costs. Material structures having a passive electromagnetic field focusing function tuned for frequencies greater than radio frequencies, such as GHz frequencies, may be manufactured to a smaller form factor using conventional manufacturing techniques, thereby reducing the cost of manufacturing; however, electromagnetic fields having frequencies in the GHz range are not always optimal for oral treatment applications.

Accordingly, by providing the oral treatment unit with an electromagnetic field focusing element with a modulation function, the oral treatment unit may include a material structure tuned to focus and confine electromagnetic fields in the high electromagnetic frequency range, such as GHz frequency range, and the modulation function may modulate the frequency of the focused EM field to bring the frequency into the radio frequency range for use in treatment of the oral cavity.

In an embodiment, the modulation function comprises a frequency downshift function, which modulates the initial frequency of the confined electromagnetic field, thereby generating a modulated, confined electromagnetic field having a modulated frequency in a desired frequency range lower than the initial frequency.

In this way, the initial frequency of the confined EM field, which may for example be in the GHz range, may be shifted down to a desired frequency range, such as the radiofrequency range.

In an embodiment, the modulation function is adapted to modulate one or more of:
a frequency of the confined electromagnetic field;
an amplitude of the confined electromagnetic field; and
a phase of the confined electromagnetic field.

In this way, the initial EM field may be modulated in any desirable manner according to the application.

In an embodiment, the electromagnetic field focusing element comprises a mechanical actuator for performing the modulation function, wherein the mechanical actuator is adapted to impart a mechanical oscillation to the first material structure, and optionally wherein the mechanical actuator comprises one or more of:
a CMUT;
an electro-active polymer;
a ferroelectric polymer actuator;
a piezoelectric actuator;
a piezoelectric bending actuator; and
a MEMS tilting motion device.

The passive electromagnetic field focusing function of the material structure is controlled by the internal resonance of the material structure. By providing a mechanical oscillation to the material structure, by way of the mechanical actuator, the internal resonance of the material structure may be modulated based on the frequency of the mechanical oscillation. The mechanical actuator may have non-linear performance, for example by design or by including an additional electric diode component.

In an embodiment, the mechanical actuator comprises a flexible component (335), and wherein the first material structure is incorporated into the mechanical actuator.

In this way, the mechanical actuation unit and material structure may be formed into a single component to perform both signal modulation and electromagnetic field focusing functions.

In an embodiment, the first material structure has a second passive electromagnetic field focusing function, and wherein the first passive electromagnetic field focusing function acts on a first frequency component of the received electromagnetic field and the second passive electromagnetic field focusing function acts on a second frequency component of the received electromagnetic field.

In this way, both the first and second frequency components may be focused and confined within the first material structure, thereby causing frequency mixing, also referred to as heterodyning, to occur, thereby modulating the frequency of the received electromagnetic field.

In an embodiment, the electromagnetic field focusing element comprises a second material structure, wherein the second material structure has a second passive electromagnetic field focusing function, and wherein the first passive electromagnetic field focusing function acts on a first frequency component of the received electromagnetic field and the second passive electromagnetic field focusing function acts on a second frequency component of the received electromagnetic field and optionally wherein the first material structure is arranged relative to the second material structure such that the focused first frequency component and the focused second frequency component are confined within both the first material structure and the second material structure, thereby causing frequency mixing to occur between the focused first frequency component of the received electromagnetic field and the focused second frequency component of the received electromagnetic field, thereby performing the frequency modulation function.

In this way, both the first and second frequency components may be focused and confined within the first and second material structures, thereby causing frequency mixing, also referred to as heterodyning, to occur, thereby modulating the frequency of the received electromagnetic field.

In an embodiment, the first material structure and/or the second material structure has a time delay function, which causes a time-domain waveform to be imparted on the focused electromagnetic field.

In this way, time-domain waveforms may be imparted on the electromagnetic field, for example to deliver a series of focused electromagnetic pulses having a given duty cycle.

In an embodiment, the electromagnetic field focusing element comprises a non-linear electronic component adapted to perform the frequency modulation function on the received electromagnetic field, and optionally wherein the non-linear electronic component comprises one or more of:
a diode;
a plurality of diodes;
a MIM device
a transistor; and
a passive transistor.

In an embodiment, the oral treatment unit further comprises one or more transmitter coils adapted to generate the electromagnetic field to be received by the electromagnetic field focusing element.

According to examples in accordance with an aspect of the invention, there is provided a base unit for use in combination with the oral treatment unit described above, comprising:
a power source;
an electrical signal generation unit coupled to the power source and adapted to generate an electrical signal having a frequency in a given frequency range; and
one or more transmitter coils in communication with the electrical signal generator adapted to generate and transmit at least one electromagnetic field having a frequency within the given frequency range to the oral treatment unit.

According to examples in accordance with an aspect of the invention, there is provided a base unit for use in combination with the oral treatment unit described above, comprising:
a power source;
an electrical signal generation unit coupled to the power source and adapted to generate an electrical drive signal having a frequency in a given frequency range feeding the one or more transmitter coils of the oral treatment unit.

According to examples in accordance with an aspect of the invention, there is provided an oral treatment device comprising:
one or more of the oral treatment units described above; and
the base unit described above, wherein the oral treatment unit is adapted to be temporarily coupled to the base unit.

According to examples in accordance with an aspect of the invention, there is provided an oral treatment device comprising:
one or more of the oral treatment units as described above;
the base unit described above; and
wherein the oral treatment unit is adapted to be temporarily coupled to the base unit, and wherein the oral treatment unit further comprises a first electrical contact and the base unit further comprises a second electrical contact, wherein the first electrical contact and the second electrical contact are in contact when the oral treatment unit is coupled to the base unit.

According to examples in accordance with an aspect of the invention, there is provided an oral cleaning device as described above, wherein:

the oral treatment unit is an electric toothbrush head, or part of an electric toothbrush head, wherein the electric toothbrush head optionally comprises a fluid emitting nozzle, and wherein the base unit is an electric toothbrush handle; or one or more oral treatment units are arranged to form at least part of an arch of an oral treatment mouthpiece, and wherein the base unit is an electric mouthpiece handle.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 3b shows a corresponding R-L-C equivalent resonance circuit for the unit cell of FIG. 3a;

DETAILED DESCRIPTION OF THE EMBODIMENTS

Figure 1:
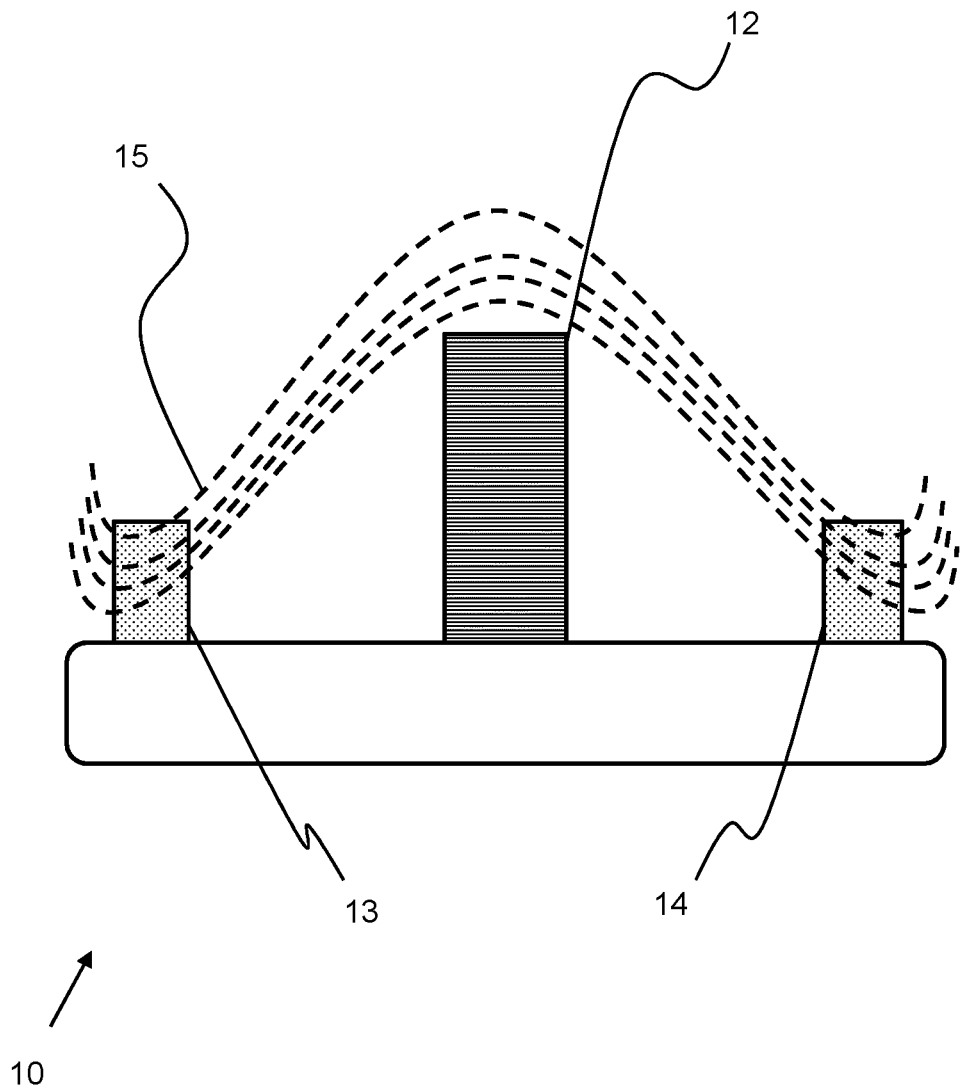
FIG. 1 a schematic representation of an example of a simulation result of an existing oral treatment unit.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an oral treatment unit, or an assembly of a plurality of oral treatment units, for confining an electromagnetic field having a frequency in the range of 100 kHz to 300 MHz and adapted to be inserted into an oral cavity, which may form part of an oral cleaning device in combination with a base unit, including a first cleaning element coupled to the oral treatment unit. The oral treatment unit further includes a material structure coupled to the oral treatment unit adapted to receive an initial electromagnetic field and output a focused electromagnetic field, wherein the material structure has a passive electromagnetic field focusing function, which focuses the received initial electromagnetic field in the near-field region of the material structure.

A further aspect of the invention provides an oral treatment unit, or an assembly of a plurality of oral treatment units, for confining and modulating an electromagnetic field having a frequency in the range of 1 MHz to 300 GHz and adapted to be inserted into the mouth, which may form part of an oral cleaning device in combination with a base unit, including a first cleaning element coupled to the oral treatment unit. The oral treatment unit further comprises an electromagnetic field focusing element adapted to receive an electromagnetic field having an initial frequency and output a focused electromagnetic field. The electromagnetic field focusing element comprises a first material structure having a first passive electromagnetic field focusing function, which confines the modulated electromagnetic field at a given distance from the first material structure by performing one or more of: an attenuation rate control function in the near-field region of the first material structure; or a propagation direction modification function on the electromagnetic field. The electromagnetic field focusing element has a modulation function that modulates the confined electromagnetic field, thereby generating a modulated electromagnetic field.

Figure 2:
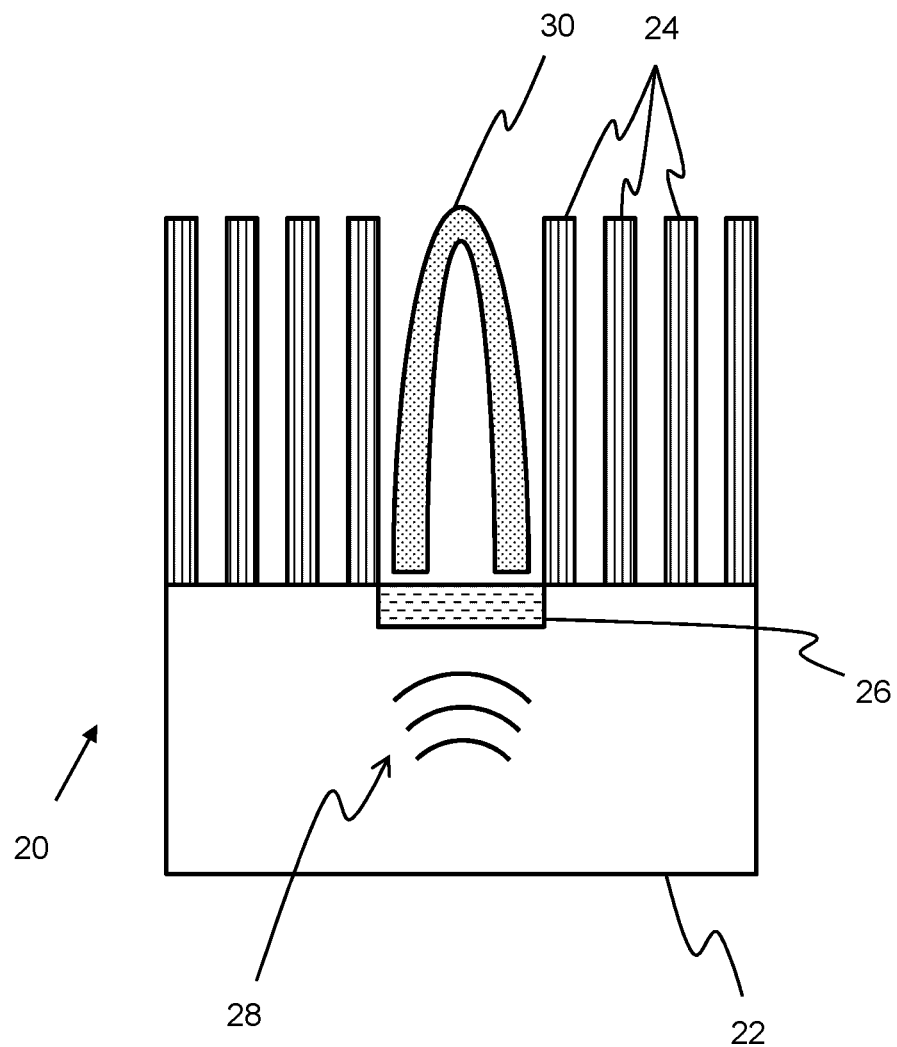
FIG. 2 shows a schematic representation of an oral treatment unit for treating an oral cavity of a user according to an aspect of the invention.

FIG. 2 shows a schematic representation of an oral treatment unit 20 for treating an oral cavity of a user according to an aspect of the invention. The treatment of the oral cavity may include, for example, cleaning any of the teeth, gums or tongue of the user.

The oral treatment unit 20 comprises a platen 22, which is defined as a foundational piece for receiving a variety of components to form a device, or sub-unit of a device, that may be shaped according to the desired implementation. For example the platen may be flat or curved. The oral treatment device comprises one or more cleaning elements 24 coupled to the oral treatment device. The oral treatment unit may form part of any suitable oral treatment device, such as a brushing mouthpiece. In the example shown in FIG. 2, the oral treatment unit may be part of a head of a toothbrush, such as an electric toothbrush, and the cleaning element is a toothbrush bristle. Alternative oral treatment units and cleaning elements are described further below.

The oral treatment unit 20 further comprises a material structure 26, comprising a plurality of unit cells, coupled to the oral treatment device and adapted to receive an electromagnetic field 28 and output a focused electromagnetic field 30. The material structure has a passive radio frequency focusing function, which focuses the received radio frequency signal in the near-field region of the material structure.

The material structure is an example of a so-called metamaterial, and more specifically an electromagnetic metamaterial. Using computational modelling and algorithmic design processes, electromagnetic metamaterials can be designed with tailorable and exotic electromagnetic properties, such as: a negative or near-zero effective permittivity; a negative or near-zero effective permeability; and a negative or near-zero refractive index.

Metamaterials are an emerging technology and defined as engineered materials governed by their structure, i.e. the geometric arrangement of one or more materials and unit cells, rather than by their composition. Metamaterials may be designed to enable features that are not available in naturally occurring materials, such as negative refractive index. Metamaterials, such as the material structure 26 may consist of an array of unit cells, whose characteristic size is much smaller than the signal wavelengths utilized by the devices described herein as further discussed below. Details regarding example unit cells of the material structure are discussed below with reference to FIG. 3.

By tailoring the metamaterial effective properties according to a desired electromagnetic field focusing function, electromagnetic waves and/or fields may be manipulated, by absorbing, blocking, enhancing, bending or reflecting the electromagnetic waves.

Electromagnetic metamaterials may show negative or near-zero effective permeability, negative or near-zero effective permittivity, or negative or near-zero refractive index, which occurs when the permittivity and permeability of the material structure are both simultaneously negative.

In general, a negative refractive index is desired for EM field focusing. In the case of an EM field having a frequency in the low MHz radio frequency (RF) range, only super-resolution in the near-field, defined as locations less than one wavelength far from the source, is required. Further, only one of the effective electromagnetic properties needs to be negative as this would be sufficient to enhance evanescent waves in order to create the focused RF electromagnetic field. In addition, in the low-frequency quasi-static limit, i.e. for frequencies in the low MHz range, electric and magnetic fields are mostly decoupled, thereby, simplifying the material requirements.

The EM fields of interest to the invention may have a wide range of frequencies, such as from the radiofrequency (RF) range to microwaves, for example from 100 kHz-300 GHz, the wavelengths are generally long, in the meter range, which is particularly large for small devices, such as oral cleaning devices. Therefore, unit cells of metamaterials may be miniaturized towards dimensions for the deep sub-wavelength region. Wavelength to unit cell size ratios of 2000 up to 14400 are currently possible, enabling miniaturized compact RF metamaterial structures, suitable for oral care devices.

Figure 3A:
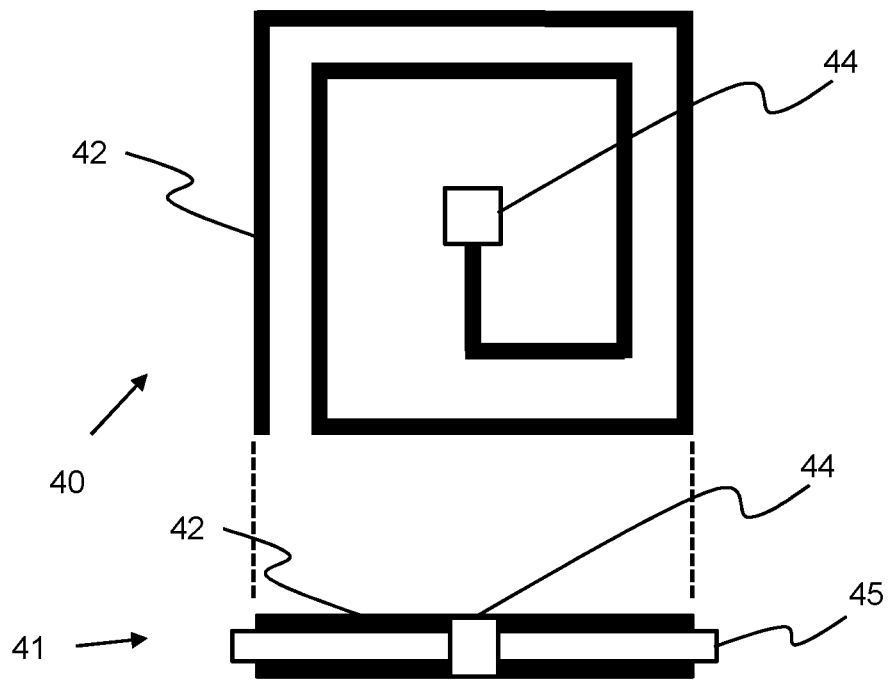
FIG. 3a shows a schematic representation of an example unit cell of the material structure shown in FIG. 2.
Figure 3B:
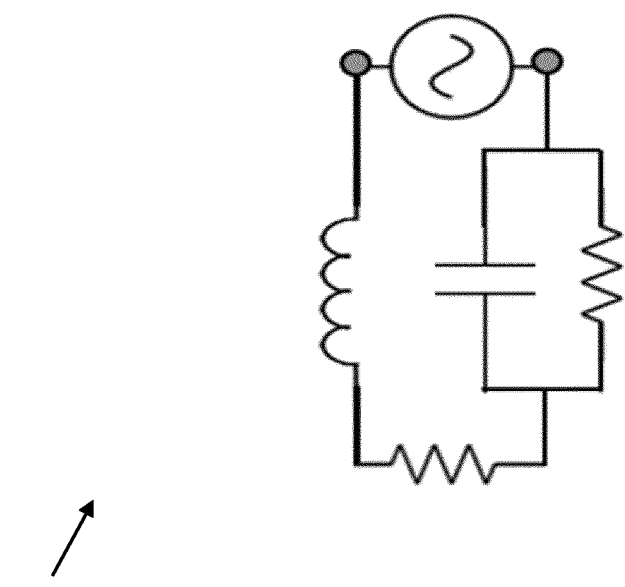

FIG. 3a shows a schematic representation of an example unit cell 40 from a plan view and a cross sectional view 41 of the material structure shown in FIG. 2. FIG. 3b shows a simplified version of the corresponding R-L-C equivalent resonant circuit 50 for the unit cell 40 of FIG. 3a.

The characteristics of the unit cell 40 shown in FIG. 3a are defined by several characteristic dimensions. These are: the width of the conductive path 42, the spacing between conductive paths, and the side length of the central capacitive pad 44, which can be connected through the full thickness of the dielectric layer 45 to a second central capacitive pad 44 (not shown) at the bottom of the dielectric layer. In some examples, central capacitive pad 44 may not extend through the full thickness of the dielectric layer 45. The EM field shaping and focusing effects of metamaterials is due to negative effective electromagnetic parameters, such as negative permeability, induced by internal resonances within the unit cell. The internal resonances are defined by the unit cell design, which can equivalently regarded as the resonant R-L-C circuit shown in FIG. 3b, in which the inductance and capacitance are functions of the geometric parameters of the unit cell in addition to the material parameters, including conductivity, permeability and permittivity. Additional geometric parameters that affect the internal resonances of the unit cell include the number of turns, the side length of the square coil, the unit cell size and the distance between different layers of unit cells.

Further, the unit cell may include a dielectric layer 45 as shown by the cross sectional view 41. The dielectric layer may be formed of any suitable dielectric material. In an example, the dielectric layer may comprise a glass-reinforced epoxy laminate material.

The R-L-C circuit shown in FIG. 3b corresponds to a quasi-static representation of the unit cell design. The inductance L is given by the self-inductance of the spirals, the capacitance C corresponds to the equivalent capacitance given by the sum of the total distributed capacitance between parallel sidewalls (adjacent turns) and a vertical capacitor formed by two square conductive pads in the middle of the unit cell, and the resistor R corresponds to the total resistance given by the sum of the resistance caused by skin effect, the proximity loss caused by eddy currents, the sheet resistance of the metallic trace and the dielectric loss. High-order effects such as capacitive coupling between non-adjacent sidewalls may be assumed to be negligible.

The unit cell shown in FIG. 3a is an example of a planar spiral resonator, which belongs to the group of metamaterials exhibiting a negative or near-zero effective permeability; however negative or near-zero dielectric permittivity, or negative or near-zero refractive may also be realized. Examples of deep sub-wavelength metamaterial designs of this type for RF frequency range signals may have a unit cell size a in the order of a~$\lambda_0$/2000, where $\lambda_0$ is the free space wavelength and a is the unit cell characteristic size. The free space wavelength for radio frequencies in the range between 3 MHz and 300 GHz is of the order of 1 millimeter to 100 meters. Following the fraction of lengths above ($\lambda_0$/2000), metamaterials with unit cells sizes in 0.5 μm-50 mm range may be designed, which is an acceptable range for oral cleaning devices, for example within the platen of a toothbrush or a full arch of a mouthpiece. Even smaller unit cell sizes may be designed in the range 0.07 μm-7 mm, following the latest manufacturing technology with $\lambda_0$/14400.

The material structure, or metamaterials, described above, which possess a negative or near-zero dielectric permittivity c and/or negative or near-zero magnetic permeability and/or negative or near-zero refractive index, are considered as passive elements. Through structural design, the transmitted RF field, received by the material structure, thereby passing through the metamaterial produces either an evanescent wave, i.e., an oscillating electric and/or magnetic field that does not propagate as an electromagnetic wave but whose energy is spatially concentrated, and in particular within the near-field region of the material structure, or a redirected propagating wave in the case of frequencies in the GHz frequency range as discussed further below.

As discussed above, metamaterials make use of internally resonant unit cells, as building blocks. The underlying physical phenomenon in metamaterials results from the interaction between internal resonance and the incoming electromagnetic wave, as well as the interaction between unit cells, in the form of signal interference. Both interactions combined give rise to a band gap, a frequency band within which evanescent waves occur, promoting wave attenuation. Having only one resonator (unit cell) provides only local attenuation (only modal coupling at a particular frequency). Having a collective arrangement of resonators generates global attenuation, and thus a band gap and corresponding evanescent wave is generated.

The unit cells within the material structures discussed herein may be arranged in a 1D, 2D or 3D periodic arrangement to form a regular array of unit cells.

Typically, computational simulations, referred to as in silico models, may be used to design and measure the effective properties of proposed metamaterials. The in silico designed materials can be manufactured in a straightforward manner using commercially available standard manufacturing technologies such as: thin film manufacturing processes, additive manufacturing and printed circuit board photolithography.

Further, metamaterials with certain target properties may be designed using existing design processes such as machine learning, which can be used to explore large parametric design spaces and even design metamaterial structures from scratch. In addition, trial and error parametric exploration methods may be used to optimize the design within a given set of constraints, such as the design of an initial metamaterial repeating unit with some adjustable parameters.

New fabrication techniques including 3D printing are enabling fast and cheap production of materials with complex internal structures, including electromagnetic metamaterials.

Returning briefly to FIG. 2, the oral treatment unit 20 comprising the material structure 26 as described above, provides a means of shaping and focusing the received radio frequency signal 28 by way of a focusing function implemented, for example, by an array of unit cells as described above. In other words, the material structure 26 may either transform propagating electromagnetic fields 28 into an evanescent wave, thereby promoting a passive EM field 30, or manipulate/redirect propagating waves, as for instance, promoting negative refraction, and enabling field focusing 30.

Figure 4:
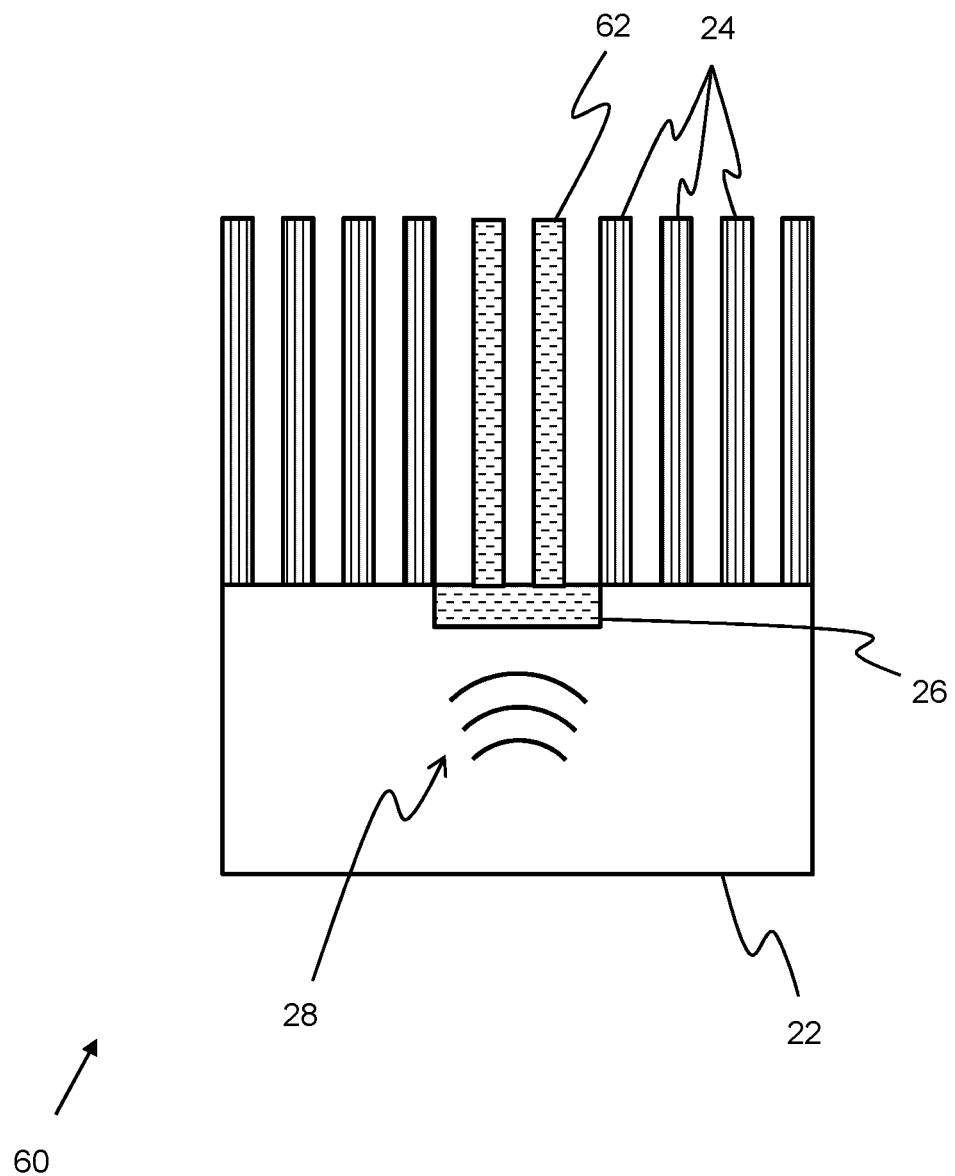
FIG. 4 shows a further example of an oral treatment unit according to an aspect of the invention.

FIG. 4 shows a further example of an oral treatment unit 60 according to an aspect of the invention. Reference numerals shared with FIG. 2 refer to similar features.

In the example shown in FIG. 4, the oral treatment unit 60 further comprises an additional cleaning element 62, and wherein the material structure 26 is incorporated into the additional cleaning element or wherein the material structure 26 is arranged to form the additional cleaning element 62 itself Put another way, the metamaterial unit cell or the additional cleaning element 62 comprising the metamaterial structure may perform a dual function: the first being mechanical cleaning alongside the unmodified cleaning elements 24, i.e. bristles; and the second being EM field focusing, by means of a material structure incorporated into the additional cleaning element 62 which may comprise either an elongated out of plane spiral resonator embedded in a dielectric matrix or large diameter (wide) polymeric cleaning elements (e.g. bristles) with planar spiral metamaterial structures printed on top and bottom layers, which may be connected by a conductive wire passing through the length of the additional cleaning element.

The basic design of the unit cells of the material structure may be the same as the one shown in FIG. 3a. However, in addition, a cleaning function is added to the material structure as the metamaterial is directly integrated in a cleaning element, such as a bristle, a silicone pillar, a rubbery pad or a prophy cup.

Figure 5:
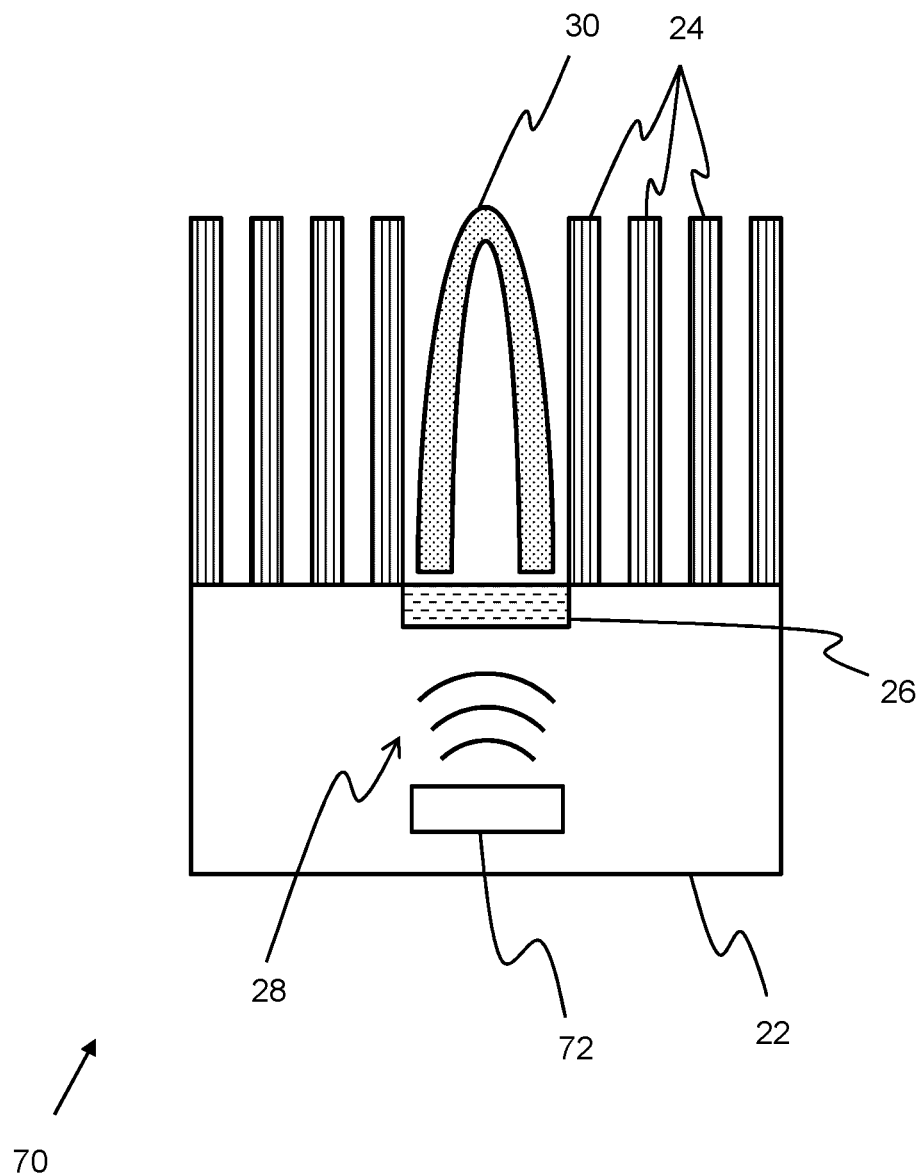
FIG. 5 shows a further example of an oral treatment unit according to an aspect of the invention.

FIG. 5 shows a further example of an oral treatment unit 70 according to an aspect of the invention. Reference numerals shared with FIG. 2 refer to similar features.

In the example shown in FIG. 5, the oral treatment unit 70 further comprises a transmitter coil 72 adapted to transmit an electromagnetic field 28 to be received by the material structure 26 as described above.

In this example, a transmitter coil, which may comprise a single loop or a solenoid, transmitting the electromagnetic field is located within platen of the oral treatment unit. The transmitter coil may be integrated into to the oral treatment unit or be temporarily attached to the oral treatment unit. The material structure is positioned at a fixed distance from the transmitter coil, typically 0.5-5 mm. The distance may be adjusted to optimize the coupling between the transmitter coil and the material structure. The coil loops and the spiral metamaterial may be faced parallel and coaxially to each other and coaxially aligned in one plane to efficiently couple the electromagnetic field into the metamaterial.

As described above, the negative or near-zero effective properties (permittivity, refractive index and permeability) of the metamaterial minimizes electromagnetic field and energy leakage and promotes better near-field focusing 30 towards the tooth or gum tissue.

Figure 6:
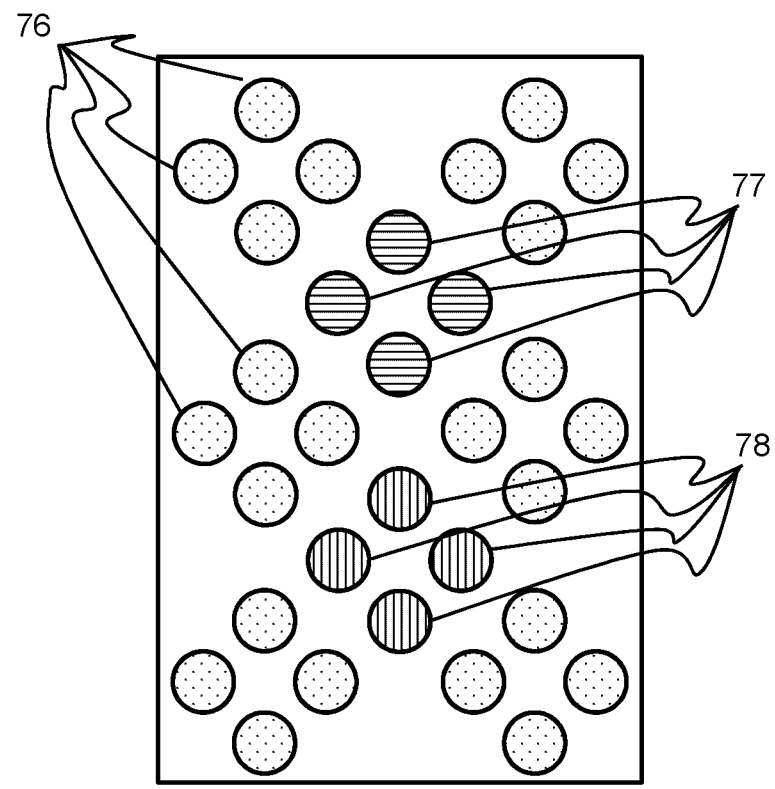
FIG. 6 shows a further example of an oral treatment unit according to an aspect of the invention.

FIG. 6 shows a further example of an oral treatment unit 75 comprising a plurality of cleaning elements 76, an array of first unit cells 77 adapted to receive and confine an electromagnetic field with a first frequency within a first frequency range and an array of second unit cells 78, adapted to receive and confine an electromagnetic field with a second frequency within a second frequency range different from the first frequency range.

In other words, the oral treatment unit or the material structure may comprise one or more arrays of multiple unit cells, each working as an electromagnetic field lens tailored to a different operation frequency, thus promoting multiple operation modes which can be implemented in oral care devices such as toothbrushes and mouthpieces.

In this embodiment, either one multi-harmonic transmitter coil or multiple transmitter coils transmitting the electromagnetic field at multiple frequencies may be incorporated into the oral treatment unit or the base unit.

Put another way, the oral treatment unit may include an array of metamaterials configured to provide enhanced EM field confinement for different resonance frequencies, with the possibility of allowing multiple operation modes targeting specific zones in the oral cavity, such as dental calculus, biofilm, stains, gum tissue, pockets, dental implants, orthodontics and the like. In this way, multiple EM energy levels can be provided on demand, without the need to activate different device operation modes. For example, the oral treatment unit may perform a cleaning mode for stain removal, a calculus treatment mode, or a gum health mode for treatment of gingival pockets all of which may require different device settings.

The oral treatment units described above may be part of or integrated in an electric toothbrush head to be used in combination with a base unit, such as an electric toothbrush handle.

Figure 7:
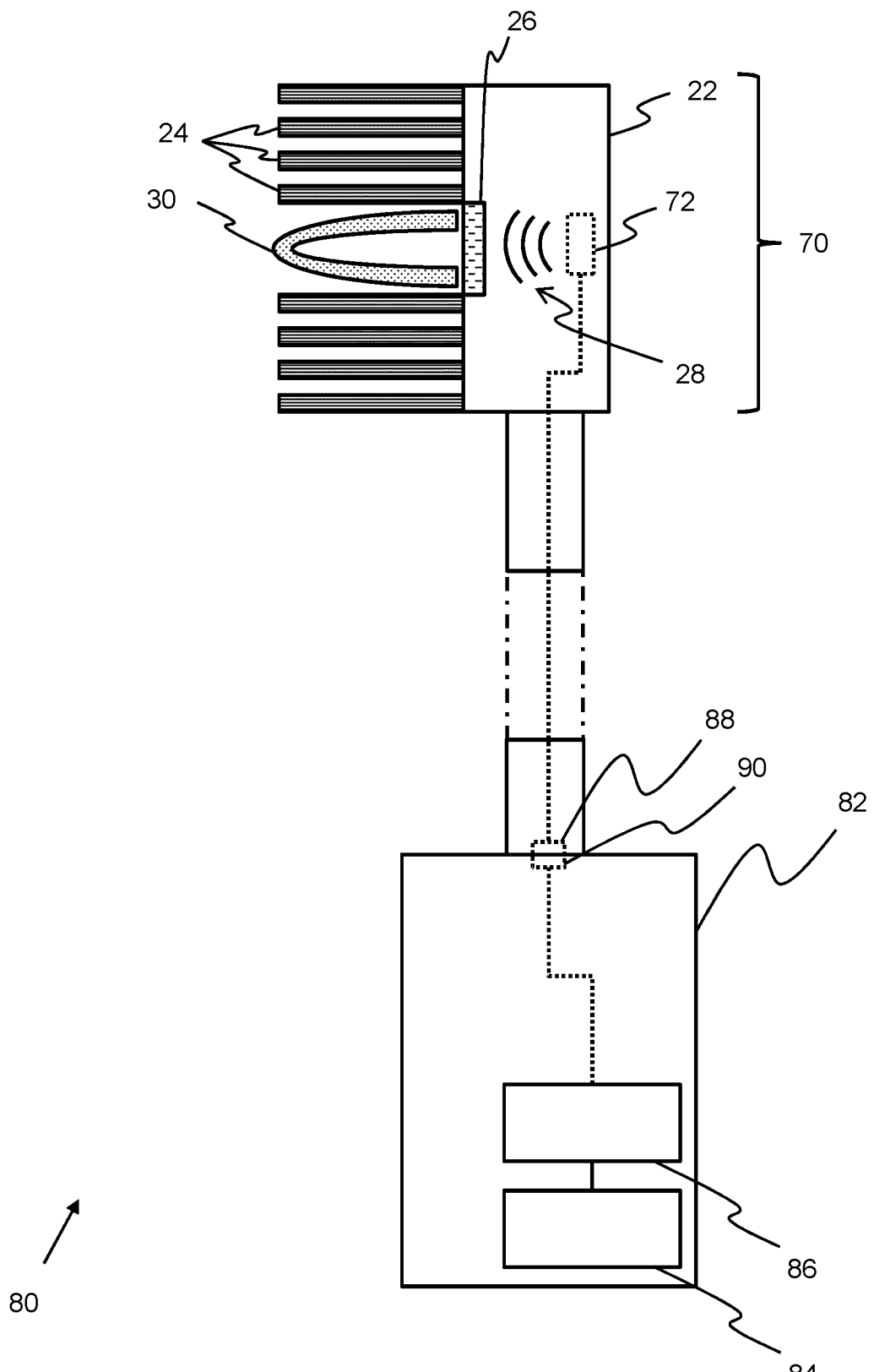
FIG. 7 shows an example of an oral cleaning device according to aspects of the invention.

FIG. 7 shows an example of an oral cleaning device 80 according to aspects of the invention, wherein the energy and signal transmission path to a transmitter coil 72 inside the oral treatment unit 70 is indicated by a dotted line.

The oral cleaning device comprises the oral treatment unit 70 as described above temporarily coupled to a base unit 82, which comprises a power source 84 and an electrical signal generation unit 86 coupled to the power source and adapted to generate an electrical drive signal. The base unit further comprises a drive train/transmission technology or actuator to generate the required mechanical motions for cleaning (not shown).

In the case where the oral treatment unit comprises a transmitter coil 72, as shown in the dotted lines, the oral treatment unit is adapted to be temporarily coupled to the base unit, and wherein the oral treatment unit further comprises a first electrical contact 88 and the base unit further comprises a second electrical contact 90, wherein the first electrical contact and the second electrical contact are in contact when the oral treatment unit is coupled to the base unit. Thus, the electrical signal generated by the electrical signal generation unit 86 is provided to the transmitter coil 72 in the oral treatment unit to generate the electromagnetic field 28 to be received by the material structure 26 to produce the output focused EM field 30.

Alternatively, if the oral treatment unit does not comprise a transmitter coil, the base unit 82 may comprise a transmitter coil in communication with the electrical signal generator adapted to transmit the electromagnetic signal to the oral treatment unit. In this case, there is no need for electrical contacts between the oral treatment unit and the base unit and no powered components are required within the oral treatment unit, as the material structure is passive.

In the examples described above, the oral cleaning device has been described in the context of an electrical toothbrush. However, the oral cleaning device may be any oral cleaning device such as a brushing/cleaning or treatment mouthpiece.

Figure 8:
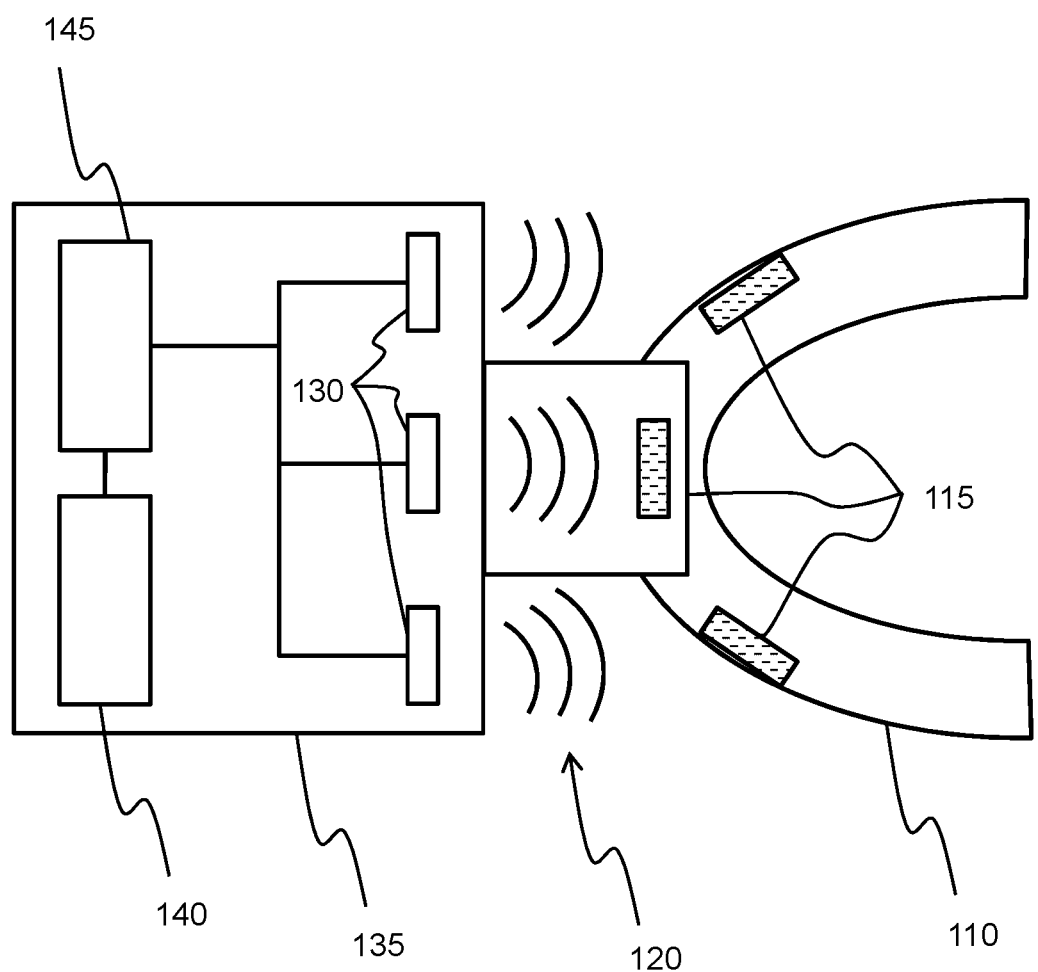
FIG. 8 show an example where the oral cleaning device is a cleaning or treatment mouthpiece.

FIG. 8 shows an example where the oral cleaning device is a treatment mouthpiece 100, wherein multiple oral treatment units 115 are coupled and arranged to form an arch 110. Each of the oral treatment unit 115, as described in detail above with reference to FIGS. 2 and 4 comprises a material structure adapted to produce a confined electromagnetic field from a received electromagnetic field 120 supplied from a plurality of transmitter coils 130 located in a base unit 135 temporarily coupled to the oral treatment units. The base unit 135 further comprises a power supply 140 and signal generator 145 that as described above with reference to FIG. 7.

Figure 9:
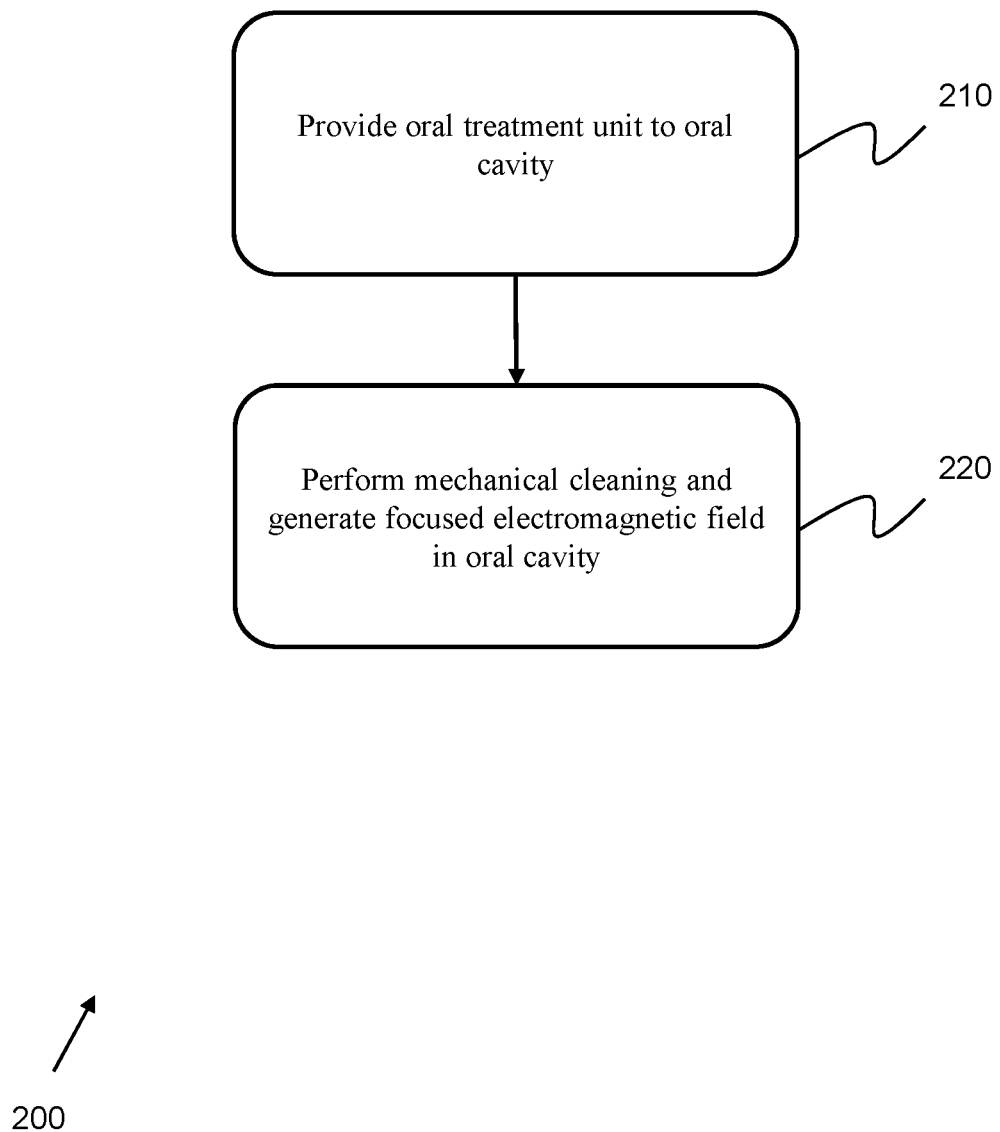
FIG. 9 shows a method for using an oral cleaning device according to an aspect of the invention.

FIG. 9 shows a method 200 for using the oral cleaning device described above.

The method begins in step 210 by providing the oral treatment unit or a plurality of oral treatment units of the oral cleaning device to the mouth of a user.

In step 220, the cleaning elements of the oral treatment unit are used to clean the oral cavity of the user using a mechanical cleaning motion and the electromagnetic signal is transmitted to the material structure of the oral treatment unit, thereby generating a focused radio frequency electromagnetic field in the vicinity of the gum or teeth of the oral cavity of the user to aid in the cleaning process.

In the examples described above, the material structure of the oral cleaning units are adapted to only perform the passive electromagnetic focusing function on the received electromagnetic field. In the field of oral treatment, the focused electromagnetic fields are preferably in the radio frequency range. Accordingly, the above examples may be adapted to receive an electromagnetic field having a frequency in the radio frequency range, and in particular, the material structure, or the unit cells of the material structure, may be adapted to focus and confine electromagnetic fields with frequencies in the radio frequency range.

However, material structures, or unit cells, having a passive electromagnetic field focusing function in the radio frequency range that are of an appropriate size and form factor for use in oral treatment devices may be difficult and costly to manufacture.

Following the fraction of lengths equation described above, metamaterials adapted to focus electromagnetic fields with a frequency in the range of 1 MHz to 300 GHz with unit cells sizes between 0.5 μm to 150 mm can be designed with conventional design techniques, or as small as 0.07 μm to 21 mm with advanced design techniques, which are acceptable ranges for oral treatment devices, for example for placement in a brush head of a toothbrush or the arch of a mouthpiece.

For metamaterials, the advantage of working with electromagnetic fields in the high electromagnetic frequency range instead of in the low electromagnetic frequency range include a reduced form factor and broader range of possible metamaterial designs that would fit inside oral treatment devices; however, EM fields operating at higher frequencies may not be suitable for oral healthcare applications.

Accordingly, the inventors have recognized that, in addition to the features and functions of the oral treatment units, base units and combinations thereof described above, an oral treatment unit may comprise an electromagnetic field focusing element adapted to receive an electromagnetic field having an initial frequency, for example in the GHz frequency range, and output a focused electromagnetic field in the MHz frequency range, for example in the radio frequency range. The electromagnetic field focusing element comprises a first material structure, such as those material structures described above, wherein the first material structure has a first passive electromagnetic field focusing function, which confines the received electromagnetic field at a given distance from the first material structure at the initial frequency performing one or more of an attenuation rate control function in the near-field region of the first material structure or a propagation direction modification function on the electromagnetic field. The electromagnetic field focusing element then modulates the electromagnetic field by way of a modulation function, thereby generating a modulated, confined electromagnetic field.

The electromagnetic field focusing element and the modulation function may be implemented in a number of ways, some examples of which are described below. It should be noted that the oral treatment units described below may be incorporated into any of the systems described above.

The modulation function may be adapted to modulate one or more of a frequency, an amplitude and a phase of the confined electromagnetic field. In a particular example, the modulation function comprises a frequency downshift function, which modulates the initial frequency of the confined electromagnetic field, thereby generating a modulated, confined electromagnetic field having a modulated frequency in a desired frequency range lower than the initial frequency.

In one example, the electromagnetic field focusing element may comprise a non-linear electronic component, such as a diode, a plurality of diodes, a MIM device (which is a metal-insulator-metal device which has the function of a back-to-back diode) a transistor or a passive transistor, adapted to perform the frequency modulation function on the received electromagnetic field.

Figure 10:
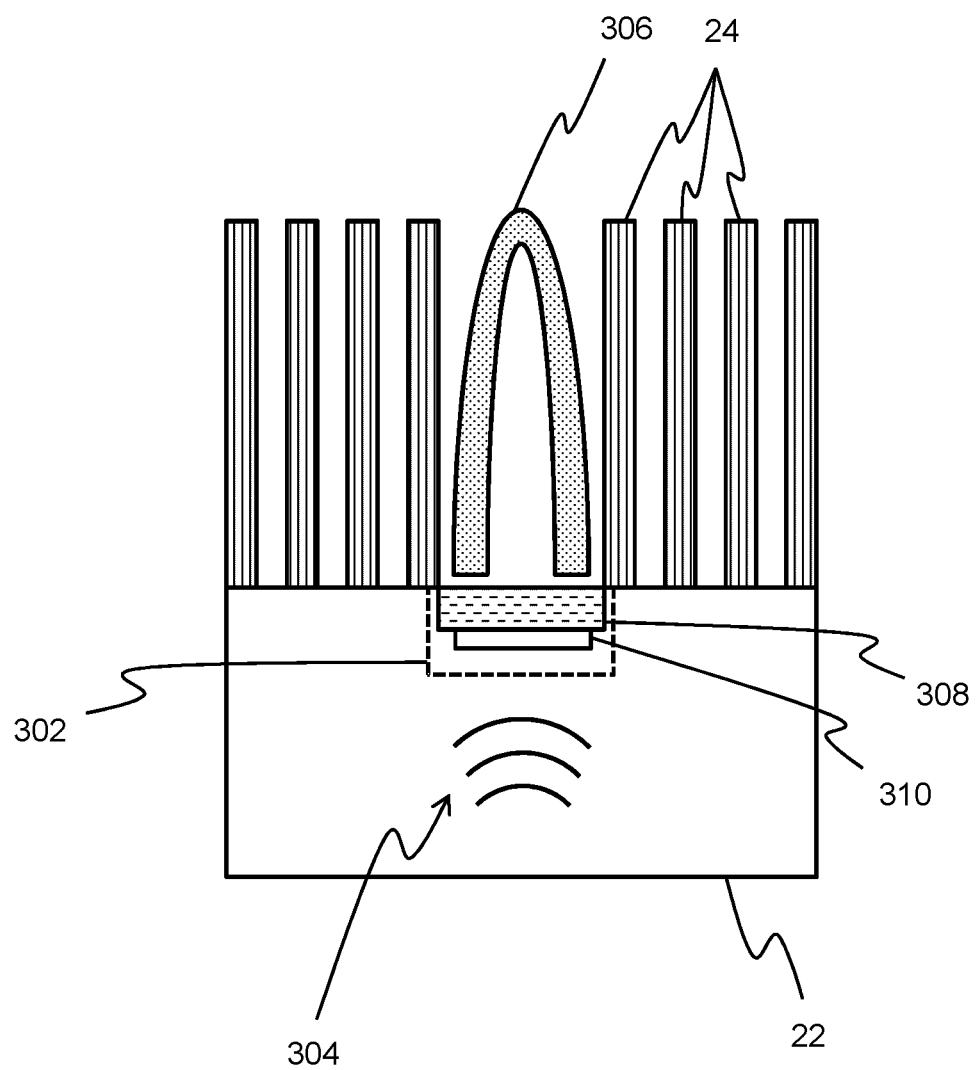
FIG. 10 shows an example of an oral treatment unit with a modulation function according to an aspect of the invention

FIG. 10 shows a schematic representation of an oral treatment unit 300 for treating an oral cavity of a user according to an aspect of the invention. The treatment of the oral cavity may include, for example, cleaning any of the teeth, gums or tongue of the user.

As in the previous examples, the oral treatment unit 300 comprises a platen 22 and one or more cleaning elements 24 coupled to the oral treatment unit. As above, the platen is defined as a foundational piece for receiving a variety of components to form a device, or sub-unit of a device, that may be shaped according to the desired implementation. For example the platen may be flat or curved. The oral treatment unit may form part of any suitable oral treatment device, such as a brushing mouthpiece. In the example shown in FIG. 10, the oral treatment unit may be part of a head of a toothbrush, such as an electric toothbrush, and the cleaning element is a toothbrush bristle. Alternative oral treatment units and cleaning elements are described further below.

In the example shown in FIG. 10, the oral treatment unit 300 further comprises an electromagnetic field focusing element 302 adapted to receive an electromagnetic field 304 having an initial frequency and output a focused, modulated electromagnetic field 306. The electromagnetic field focusing element 302 comprises a material structure 308, comprising a plurality of unit cells, adapted to receive the electromagnetic field and output a focused electromagnetic field 306. The material structure has a passive electromagnetic focusing function, which focuses the received electromagnetic field in the near-field region of the material structure by way of field attenuation control or, alternatively, by redirecting propagating electromagnetic waves, thereby promoting negative refraction and electromagnetic field focusing.

Further, the electromagnetic field focusing element 302 comprises a mechanical actuator 310 such as a capacitive micromachined ultrasonic transducer (CMUT), a ferroelectric polymer actuator, an electro-active polymer, a vibrator or a digital mirror device, for performing the modulation function, wherein the mechanical actuator is adapted to impart a mechanical oscillation to the first material structure 308. The mechanical oscillations imparted on the first material structure by the mechanical actuator cause the internal resonance of the material structure, or unit cells of the material structure, to shift according to the frequency of the mechanical oscillations. In this way, the frequency, amplitude or phase of the confined electromagnetic field may be modulated according to the frequency of the mechanical oscillations. For example, the phase of the confined electromagnetic field may be modulated by providing two mechanical oscillators each imparting mechanical oscillations on the first material structure.

In practice, one or more transmitter coils, located either in the oral treatment unit or a coupled base unit as described above, are used to generate and radiate a high frequency electromagnetic field, for example in the GHz range, with two frequency components very close to each other. This electromagnetic field impinges on the material structure 308 that coupled to a mechanical actuator 310 or hybrid part comprising a metamaterial integrated into the mechanical actuator itself. The role of the material structure is to modify the electromagnetic field either by controlling the attenuation rate in the case where an evanescent field is generated or of the focus distance in the case where a backward wave is generated. The mechanical actuator may operate in the MHz range, and modifies the internal resonance of the unit cells making up the material structure, thereby providing a modulation of the electromagnetic field confined by the material structure.

Put another way, one or more metamaterial unit cells may be actuated mechanically in order to enable low-frequency, for example in the MHz range, electromagnetic field control and focusing at a controlled distance. The mechanical actuator may have non-linear performance, for example by design or by including an additional electric diode component.

Suitable mechanical actuators may include piezoelectric elements, as these crystalline actuators are one of the few solid state (non-MEMS) actuators which are able to vibrate in the desired frequency range, i.e. the radio frequency, MHz range. For example, an array of piezo actuators may be placed under the material structure and actuated at the required MHz frequencies.

For a standard mechanical actuator, the linear actuation distance may be smaller than required unless the actuators are large enough. Consequently, the form factor of the electromagnetic field focusing element may be larger than is ideal for incorporating into the oral treatment unit. However, mechanical actuators having a very compact form, for example bending style actuators that comprise a double layer structure of a thin piezo layer on top of a thin substrate, are available. In particular, in a bending style actuator, a large actuation distance is achieved by a bend perpendicular to the actuator, resulting from a much smaller linear expansion of the piezo layer compared to the fixed substrate.

The material structure 308 is positioned at a fixed distance from the transmitter coil and the coil loops and the unit cells of the material structure may be faced parallel to each other and coaxially aligned in one plane to efficiently couple the electromagnetic field into the material structure. The material structure minimizes field leakage and provides a controllable electromagnetic field focusing towards the tooth or gum tissue, whereas the mechanical actuator coupled to the electromagnetic metamaterial provides signal modulation to deliver a controllable, modulated electromagnetic field.

As in the example described above with respect to FIG. 4, the material structure may further be incorporated into a cleaning element.

Alternatively, the mechanical actuator 310 may comprise a microelectricalmechanical system (MEMS) tilting motion device, such as a Digital Mirror Device (DMD), which controls the position of a small mirror using electrostatic forces generated by electrodes. As a MEMS device, the DMD may be positioned below the material structure to form a very thin form factor electromagnetic field focusing element, which may be incorporated into the platen of the oral treatment unit.

The material structure may be supported by the DMD, or alternatively deposited on top of the DMD, and caused to vibrate at a MHz frequency, which is achieved by causing the mirror to rapidly tilt backwards and forwards.

Figure 11:
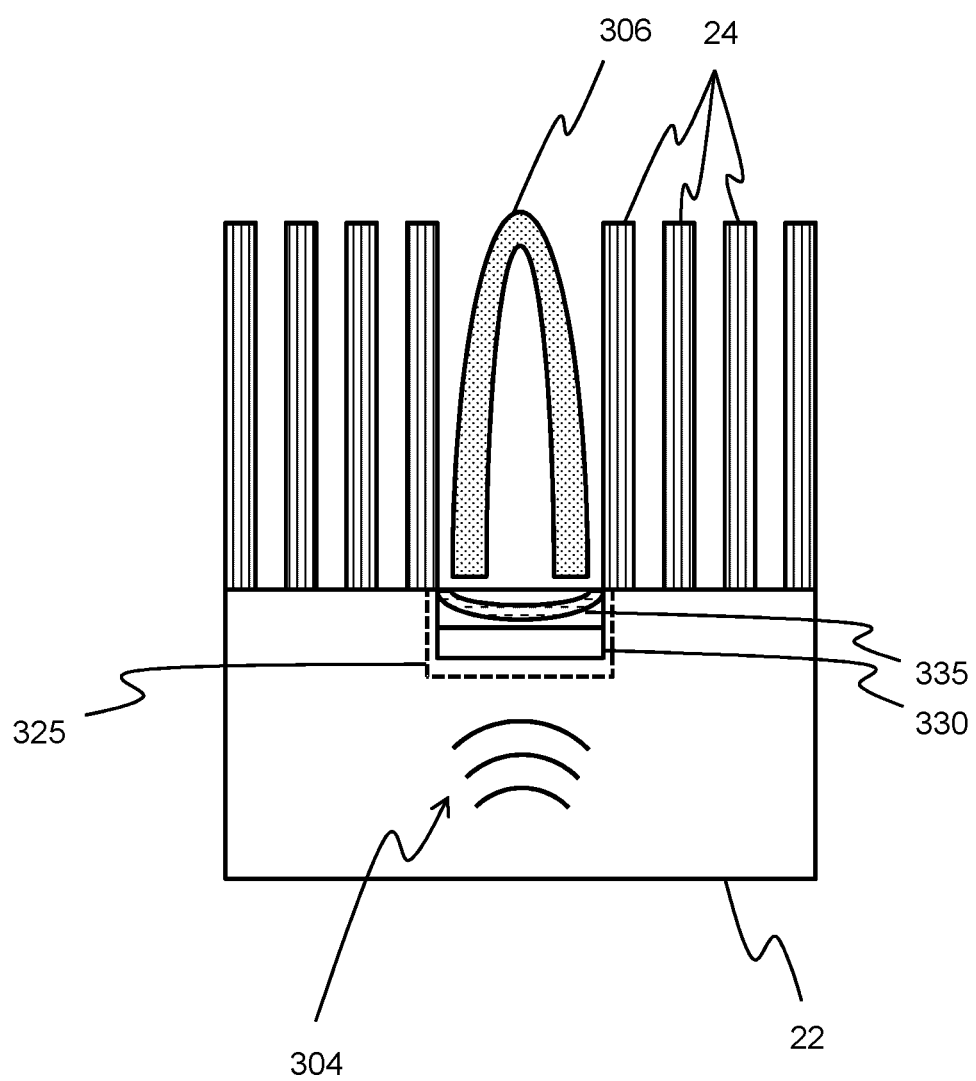
FIG. 11 shows a further example of an oral treatment unit with a modulation function according to an aspect of the invention.

FIG. 11 shows an example of an oral treatment unit 320 comprising an electromagnetic field focusing element 325 as described above, wherein the mechanical actuator 330 comprises a CMUT cell, having a membrane 335 wherein the first material structure is partially, or fully, incorporated into the membrane.

The hybrid meta-CMUT cell comprising metamaterial unit cells and enabled for bending-type mechanical actuation may be adapted to have non-linear actuation, for example by design or by an additional electric diode component. The principle of incorporating the material structure into the membrane of a CMUT may be applied to any suitable type of bending-based actuator, such as a CMUT cell, a ferroelectric polymer or an electroactive polymer (EAP).

As described above, the mechanical oscillations imparted to the material structure modulate the electromagnetic field by causing a shift in the internal resonance of the unit cells.

Figure 12:
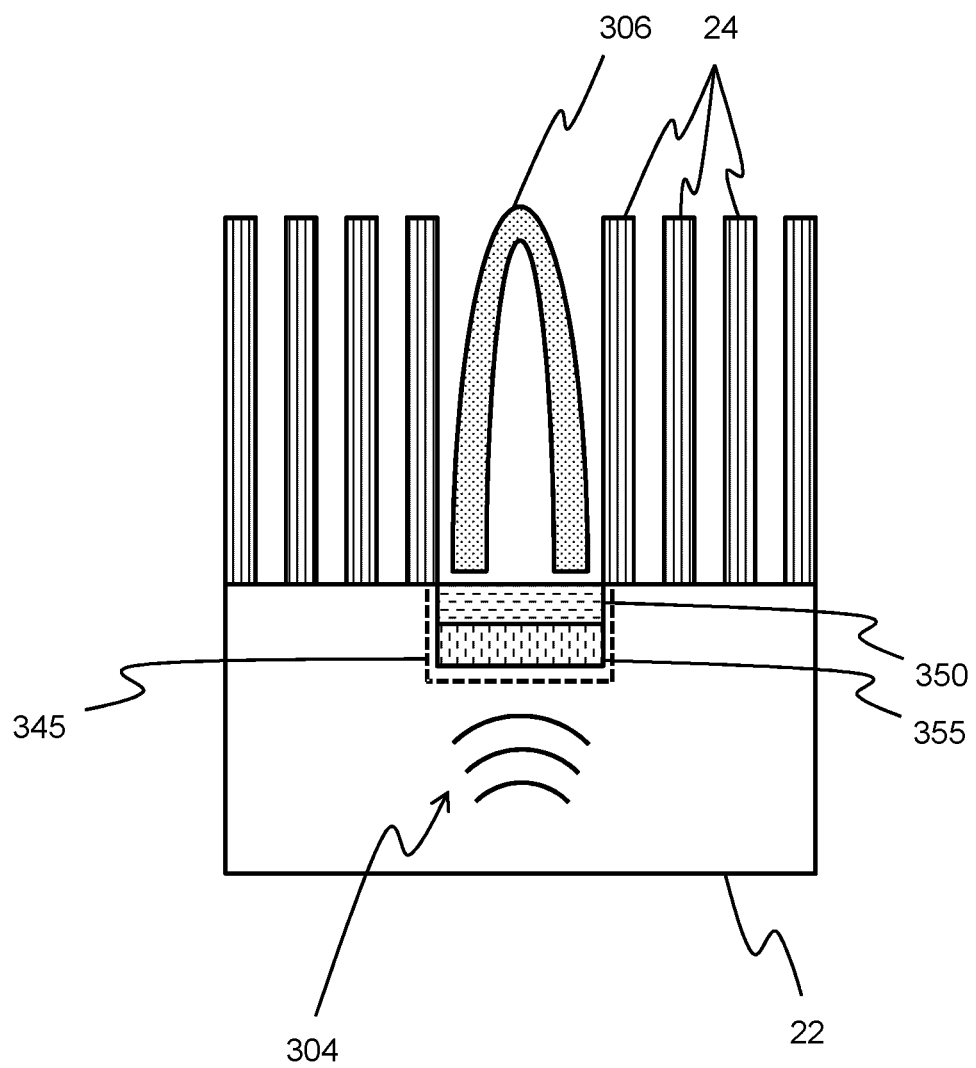
FIG. 12 shows a further example of an oral treatment unit with a modulation function according to an aspect of the invention.

FIG. 12 shows an example of an oral treatment unit 340 with an electromagnetic field focusing element 345 comprising a first material structure 350 and a second material structure 355.

As described above, the first material structure has a first passive electromagnetic field focusing function. Similarly, the second material structure has a second passive electromagnetic field focusing function and the first and second focusing functions may be tuned to act on different frequencies, such as a first and second frequency components of the received electromagnetic field, respectively.

For example, one or more transmitter coil may be used to generate and radiate a high frequency electromagnetic field, for example in the GHz range, with two frequency components very close to each other. The combination of these two frequency components within the first and second material structures, with internal nonlinearity, results in heterodyning, also referred to as frequency mixing. The first and second material structures within the electromagnetic field focusing element confine and focus the electromagnetic output field 306 for each of the two frequency components that mix to form the modulated electromagnetic field, either by generating evanescent fields with controllable attenuation rates or by modifying the propagation direction of the electromagnetic waves, for example via backward wave generation, thereby providing depth focus distance control.

Put another way, the oral treatment unit may comprise two material structures, each composed of one or more unit cells designed to target one of the two frequency components of the received electromagnetic field, which are stacked adjacent to each other and provide low-frequency, for example in the radio frequency range, electromagnetic field confinement and focusing.

By confining the first frequency component of the electromagnetic field within the electromagnetic field focusing element by way of the first material structure and the second frequency component within the electromagnetic field focusing element by way of the second material structure, frequency mixing occurs between the two frequency components, thereby generating a modulated electromagnetic field with a frequency lower than the individual frequency components.

Further, a stack of material structures tuned at different frequencies may operate as delay lines and be used to generate new time-domain waveforms that act on the electromagnetic field, such as a square wave for delivering electromagnetic impulses with a duty cycle.

Alternatively, rather than an electromagnetic field focusing element comprising a first material structure adapted to operate on a first frequency component of the electromagnetic field and a second material structure adapted to operate on a second frequency component of the electromagnetic field, an electromagnetic field focusing element comprising a single material structure adapted to operate on both the first and second frequency components may achieve similar results.

Put another way, a material structure may have a first passive electromagnetic field focusing function and a second passive electromagnetic field focusing function, wherein the first passive electromagnetic field focusing function acts on a first frequency component of the received electromagnetic field and the second passive electromagnetic field focusing function acts on a second frequency component of the received electromagnetic field.

Figure 13:
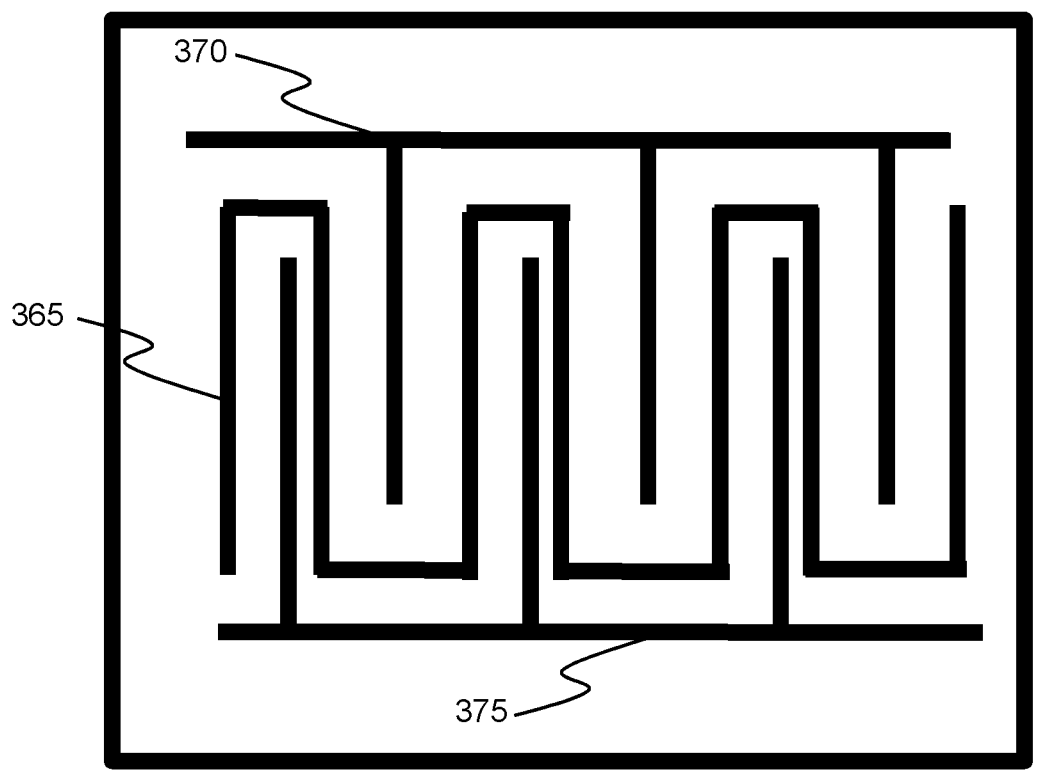
FIG. 13 shows an example of a unit cell of a material structure capable of operating on two different frequency components.

FIG. 13 shows an example of a unit cell 360 of a material structure capable of operating on a first frequency component and a second frequency component of an electromagnetic field. The unit cell 360 comprises a central conductor 365, a first conductor 370 and a second conductor 375. As can be seen from FIG. 13, the first and second conductors have different spacing between themselves and the central conductor, meaning that the unit cell will have two different internal resonance frequencies, one for the first conductor (which acts on the first frequency component) and one for the second conductor (which acts on the second frequency component).

In this example, as the material structure confines both the first frequency component and the second frequency component within the first material structure, frequency mixing between the two frequency components will occur, thereby generating a modulated electromagnetic field with a frequency lower than the individual components.

Figure 14:
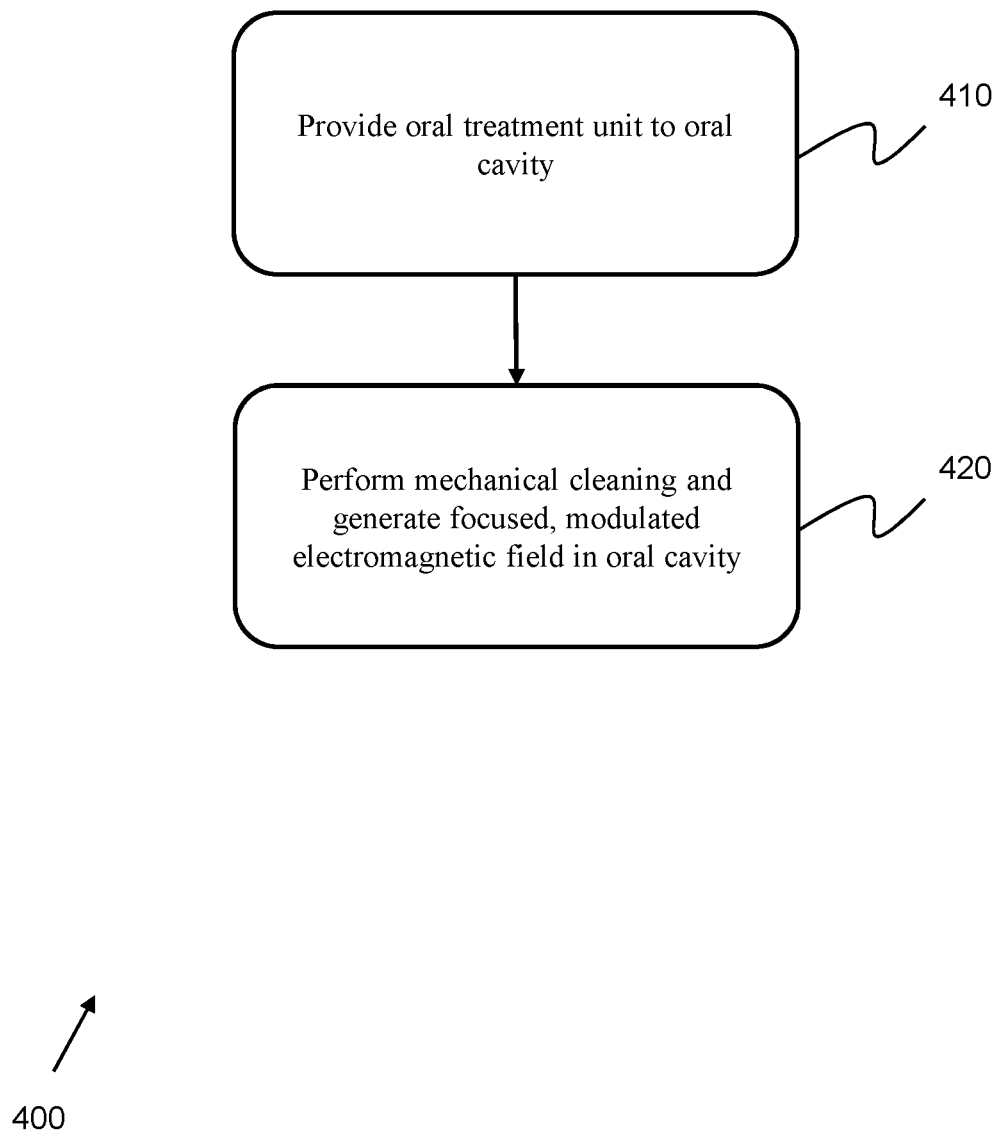
FIG. 14 shows a method for using an oral cleaning device according to a further aspect of the invention.

FIG. 14 shows a method 400 for using the oral cleaning device comprising an electromagnetic field focusing element as described above.

The method begins in step 410 by providing the oral treatment unit or a plurality of oral treatment units of the oral cleaning device to the mouth of a user.

In step 420, the cleaning elements of the oral treatment unit are used to clean the oral cavity of the user using a mechanical cleaning motion and the initial electromagnetic field is transmitted to the electromagnetic field focusing element of the oral treatment unit, thereby generating a focused, modulated electromagnetic field in the vicinity of the gum or teeth of the oral cavity of the user to aid in the cleaning process.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. An oral treatment unit for confining and modulating an electromagnetic field having a frequency in the range of 1 MHz to 300 GHz and adapted to be inserted into an oral cavity of a user, the oral treatment unit comprising:
   a first cleaning element coupled to or integrated in the oral treatment unit; and
   an electromagnetic field focusing element coupled to or integrated in the oral treatment unit and adapted to receive an electromagnetic field having an initial frequency and output a focused electromagnetic field, wherein the electromagnetic field focusing element comprises a first metamaterial structure, wherein the first metamaterial structure has a first passive electromagnetic field focusing function, which confines the received electromagnetic field at a given distance from the first metamaterial structure by performing at least one selected from the group of:

a) an attenuation rate control function in a near-field region of the first metamaterial structure; and
b) a propagation direction modification function on the electromagnetic field;
wherein the electromagnetic field focusing element has a modulation function that modulates a confined electromagnetic field, thereby generating a modulated electromagnetic field, and wherein the electromagnetic field focusing element comprises a mechanical actuator for performing the modulation function, wherein the mechanical actuator is adapted to impart a mechanical oscillation to the first metamaterial structure.

2. The oral treatment unit as claimed in claim 1, wherein the mechanical actuator comprises a flexible component, and wherein the first metamaterial structure is incorporated into the mechanical actuator.

3. The oral treatment unit of claim 2, wherein the mechanical actuator comprises a vibrator, or a digital mirror device.

4. The oral treatment unit as claimed in claim 1, wherein the modulation function comprises a frequency downshift function, which modulates the initial frequency of the confined electromagnetic field, thereby generating a modulated, confined electromagnetic field having a modulated frequency in a desired frequency range lower than the initial frequency.

5. The oral treatment unit as claimed in claim 1, wherein the modulation function is adapted to modulate one or more selected from the group of:
a frequency of the confined electromagnetic field;
an amplitude of the confined electromagnetic field; and
a phase of the confined electromagnetic field.

6. The oral treatment unit as claimed in claim 1, wherein the mechanical actuator comprises one or more selected from the group of:
a capacitive micromachined ultrasonic transducer (CMUT);
an electro-active polymer;
a ferroelectric polymer actuator,
a piezoelectric actuator;
a piezoelectric bending actuator; and
a micro-electrical-mechanical system (MEMS) tilting motion device.

7. The oral treatment unit as claimed in claim 1, wherein each metamaterial structure has one or more selected from the group of:
a negative or near-zero effective permittivity;
a negative or near-zero effective permeability; and
a negative or near-zero refractive index.

8. The oral treatment unit as claimed in claim 1, wherein the electromagnetic field focusing element further comprises a non-linear electronic component adapted to perform the frequency modulation function on the received electromagnetic field, and optionally wherein the non-linear electronic component comprises one or more selected from the group of:
a diode;
a plurality of diodes;
a micro-electrical-mechanical system (MEMS) device;
a transistor; and
a passive transistor.

9. The oral treatment unit as claimed in claim 1, wherein the oral treatment unit further comprises one or more transmitter coils adapted to generate the electromagnetic field to be received by the electromagnetic field focusing element.

10. A base unit adapted to be used in combination with the oral treatment unit of claim 1, the base unit comprising:
a power source;
an electrical signal generation unit coupled to the power source and adapted to generate an electrical signal having a frequency in a given frequency range; and
one or more transmitter coils in communication with the electrical signal generator adapted to generate and transmit at least one electromagnetic field having a frequency within the given frequency range to the oral treatment unit.

11. The base unit as claimed in claim 10, wherein the mechanical actuator comprises a flexible component, and wherein the first metamaterial structure is incorporated into the mechanical actuator.

12. The base unit as claimed in claim 10, wherein the modulation function comprises a frequency downshift function, which modulates the initial frequency of the confined electromagnetic field, thereby generating a modulated, confined electromagnetic field having a modulated frequency in a desired frequency range lower than the initial frequency.

13. The base unit as claimed in claim 10, wherein the modulation function is adapted to modulate one or more selected from the group of:
a frequency of the confined electromagnetic field;
an amplitude of the confined electromagnetic field; and
a phase of the confined electromagnetic field.

14. The base unit as claimed in claim 10, wherein the mechanical actuator comprises one or more selected from the group of:
a capacitive micromachined ultrasonic transducer (CMUT);
an electro-active polymer;
a ferroelectric polymer actuator,
a piezoelectric actuator;
a piezoelectric bending actuator; and
a micro-electrical-mechanical system (MEMS) tilting motion device.

15. A base unit adapted to be used in combination with the oral treatment unit of claim 1, comprising:
a power source; and
an electrical signal generation unit coupled to the power source and adapted to generate an electrical drive signal having a frequency in a given frequency range feeding the one or more transmitter coils of the oral treatment unit.

16. An oral treatment unit for confining and modulating an electromagnetic field having a frequency in the range of 1 MHz to 300 GHz and adapted to be inserted into an oral cavity of a user, the oral treatment unit comprising:
a first cleaning element coupled to or integrated in the oral treatment unit; and
an electromagnetic field focusing element coupled to or integrated in the oral treatment unit and adapted to receive an electromagnetic field having an initial frequency and output a focused electromagnetic field, wherein the electromagnetic field focusing element comprises a first metamaterial structure, wherein the first metamaterial structure has a first passive electromagnetic field focusing function, which confines the received electromagnetic field at a given distance from the first metamaterial structure by performing one or more selected from the group of:
a) an attenuation rate control function in the near-field region of the first metamaterial structure; and
b) a propagation direction modification function on the electromagnetic field; and wherein the electromagnetic field focusing element has a modulation function that modulates the confined electromagnetic field, thereby generating a modulated electromagnetic field, wherein:
the first metamaterial structure has a second passive electromagnetic field focusing function, and wherein the first passive electromagnetic field focusing function acts on a first frequency component of the received electromagnetic field and the second passive electromagnetic field focusing function acts on a second frequency component of the received electromagnetic field; or the electromagnetic field focusing element comprises a second metamaterial structure, wherein the second metamaterial structure has a second passive electromagnetic field focusing function, and wherein the first passive electromagnetic field focusing function acts on a first frequency component of the received electromagnetic field and the second passive electromagnetic field focusing function acts on a second frequency component of the received electromagnetic field.

17. The oral treatment unit as claimed in claim 16, comprising first and second metamaterial structures, wherein the first metamaterial structure is arranged relative to the second metamaterial structure such that the focused first frequency component and the focused second frequency component are confined within both the first metamaterial structure and the second metamaterial structure, thereby causing frequency mixing to occur between the focused first frequency component of the received electromagnetic field and the focused second frequency component of the received electromagnetic field, thereby performing the frequency modulation function.

18. The oral treatment unit as claimed in claim 17, wherein the first metamaterial structure and/or, or the second metamaterial structure, or both, have a time delay function, which causes a time-domain waveform to be imparted on the focused electromagnetic field.

19. A base unit adapted to be used in combination with the oral treatment unit of claim 16, the base unit comprising:
a power source;
an electrical signal generation unit coupled to the power source and adapted to generate an electrical signal having a frequency in a given frequency range; and
one or more transmitter coils in communication with the electrical signal generator adapted to generate and transmit at least one electromagnetic field having a frequency within the given frequency range to the oral treatment unit.

20. A base unit adapted to be used in combination with the oral treatment unit of claim 16, comprising:
a power source; and
an electrical signal generation unit coupled to the power source and adapted to generate an electrical drive signal having a frequency in a given frequency range feeding the one or more transmitter coils of the oral treatment unit.

* * * * *